United States Patent
Pan et al.

(10) Patent No.: US 12,249,831 B2
(45) Date of Patent: Mar. 11, 2025

(54) ELECTRICALLY DRIVEN DISTRIBUTED PROPULSION SYSTEM

(71) Applicant: GENERAL ELECTRIC COMPANY, Schenectady, NY (US)

(72) Inventors: Di Pan, Niskayuna, NY (US); Kum Kang Huh, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 33 days.

(21) Appl. No.: 18/194,786

(22) Filed: Apr. 3, 2023

(65) Prior Publication Data

US 2023/0238799 A1    Jul. 27, 2023

Related U.S. Application Data

(63) Continuation of application No. 17/483,308, filed on Sep. 23, 2021, now Pat. No. 11,670,942.

(51) Int. Cl.
*H02J 3/00* (2006.01)
*B64D 27/24* (2024.01)
*B64D 31/00* (2024.01)
*H02P 27/06* (2006.01)
*B64D 27/02* (2006.01)

(52) U.S. Cl.
CPC .......... *H02J 3/00* (2013.01); *B64D 27/24* (2013.01); *B64D 31/00* (2013.01); *H02P 27/06* (2013.01); *B64D 27/026* (2024.01); *B64D 2221/00* (2013.01)

(58) Field of Classification Search
None
See application file for complete search history.

(56) References Cited

U.S. PATENT DOCUMENTS

| | | | |
|---|---|---|---|
| 9,209,721 B2 | 12/2015 | Solodovnik et al. | |
| 9,745,943 B2 | 8/2017 | Vieillard | |
| 9,937,803 B2 | 4/2018 | Siegel et al. | |
| 10,287,030 B2 | 5/2019 | Lutze et al. | |
| 10,427,527 B2 | 10/2019 | Siegel et al. | |
| 10,703,496 B2 | 7/2020 | Vondrell et al. | |
| 2016/0023773 A1 | 1/2016 | Himmelmann et al. | |
| 2017/0129617 A1 | 5/2017 | Shah et al. | |
| 2018/0337531 A1* | 11/2018 | Radun | H02J 1/102 |
| 2019/0315480 A1 | 10/2019 | Elliott et al. | |
| 2020/0017232 A1 | 1/2020 | Compton et al. | |
| 2020/0115062 A1 | 4/2020 | Klonowski et al. | |

(Continued)

FOREIGN PATENT DOCUMENTS

| | | |
|---|---|---|
| EP | 3086432 A1 | 10/2016 |
| FR | 3039614 A1 | 2/2017 |

(Continued)

*Primary Examiner* — Jared Fureman
*Assistant Examiner* — Aqeel H Bukhari
(74) *Attorney, Agent, or Firm* — McGarry Bair PC

(57) ABSTRACT

A method and system for operating a hybrid propulsion system, includes controllably providing a first power to a first bus and a first inverter, electrically coupling a first motor with a second inverter by way of a second bus, operably converting, by the second inverter, the first power received by the first inverter to a starting power adapted for starting the first motor, and increasing, by the second inverter, the starting power to match the first power received.

16 Claims, 6 Drawing Sheets

(56) References Cited

U.S. PATENT DOCUMENTS

| | | | |
|---|---|---|---|
| 2020/0180454 A1* | 6/2020 | Gao | B64D 27/02 |
| 2021/0214094 A1* | 7/2021 | Harwood | H02J 3/472 |
| 2021/0273554 A1 | 9/2021 | Liu et al. | |
| 2022/0055762 A1* | 2/2022 | Clarke | B64D 27/24 |

FOREIGN PATENT DOCUMENTS

| | | |
|---|---|---|
| FR | 3083778 A1 | 1/2020 |
| WO | 2020053502 A2 | 3/2020 |

* cited by examiner

ELECTRICALLY DRIVEN DISTRIBUTED PROPULSION SYSTEM

CROSS REFERENCE TO RELATED APPLICATION(S)

This application claims priority to and benefit of U.S. patent application Ser. No. 17/483,308, filed Sep. 23, 2021, now U.S. Pat. No. 11,670,942, issued Jun. 6, 2023, which is incorporated herein in its entirety.

TECHNICAL FIELD

The present specification generally relates to systems and methods for starting and operating high frequency machines with alternating current distribution systems and, more specifically, to systems and methods for starting and operating electrically driven distributed propulsion systems.

BACKGROUND

Currently, electrically driven distributed propulsion systems utilize direct current (DC) or alternating current (AC) power distribution systems. For example, an engine drives a generator to create AC power. In a DC power distribution system, the AC power that is generated by the generator is converted to DC power and DC bus wires route the DC power to each electric motor. However, since the electric motors are AC motors, the DC power is first routed through an inverter coupled to the electric motor to invert the DC power to AC power for driving the AC electric motor. DC power distribution systems utilize lighter wiring than a comparable AC power distribution system, but require full size power inverters to be implemented with each AC electric motor, which adds weight and results in multi-stage power conversion that is less efficient. In some DC power distribution systems, circuit breakers are also included with each power inverter to control the power distribution along the DC bus and to disconnect the inverters from the DC bus when a fault happens.

In an AC power distribution system, the AC power that is generated by the generator may be provided directly to the AC electric motors through one or more switches that control the electrical connection of the AC electric motor to the generator. However, when the AC electric motor is a high frequency, high speed machine, starting the AC electric motor is very challenging since the frequency of the AC power and the amount of reactive power provided to the AC electric motor is not able to controlled to effect an efficient motor start. Additionally, AC bus wires are heavier and more lossy compared to DC bus wires.

SUMMARY

In some aspects, the disclosure relates to a method of operating a hybrid propulsion system, the method including controllably providing a first power to a first bus and a first inverter, electrically coupling a first motor with a second inverter by way of a second bus, operably converting, by the second inverter, the first power received by the first inverter to a starting power adapted for starting the first motor, increasing, by the second inverter, the starting power to match the first power received, and electrically coupling the first motor with a first bus when the starting power matches the first power received.

In some aspects, the disclosure relates to a hybrid propulsion system, including a first inverter, a second inverter electrically coupled with the first inverter and selectively couplable with either a first bus or a second bus, a first motor selectively couplable with either the first bus or the second bus, and a controller configured to electrically couple the first motor with the second inverter by way of the second bus, operably convert, by controlling the second inverter, a first power received from the first inverter to a starting power adapted for starting the first motor, increase, by controlling the second inverter, the starting power to match the first power received, and electrically coupling the first motor with a first bus when the starting power matches the first power received.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of 'a', 'an', and 'the' include plural referents unless the context clearly dictates otherwise.

BRIEF DESCRIPTION OF THE DRAWINGS

The embodiments set forth in the drawings are illustrative and exemplary in nature and are not intended to limit the subject matter defined in the claims. The following detailed description of the illustrative embodiments can be understood when read in conjunction with the following drawings, where like structures are indicated with like reference numerals and in which:

DETAILED DESCRIPTION

Figure 1:
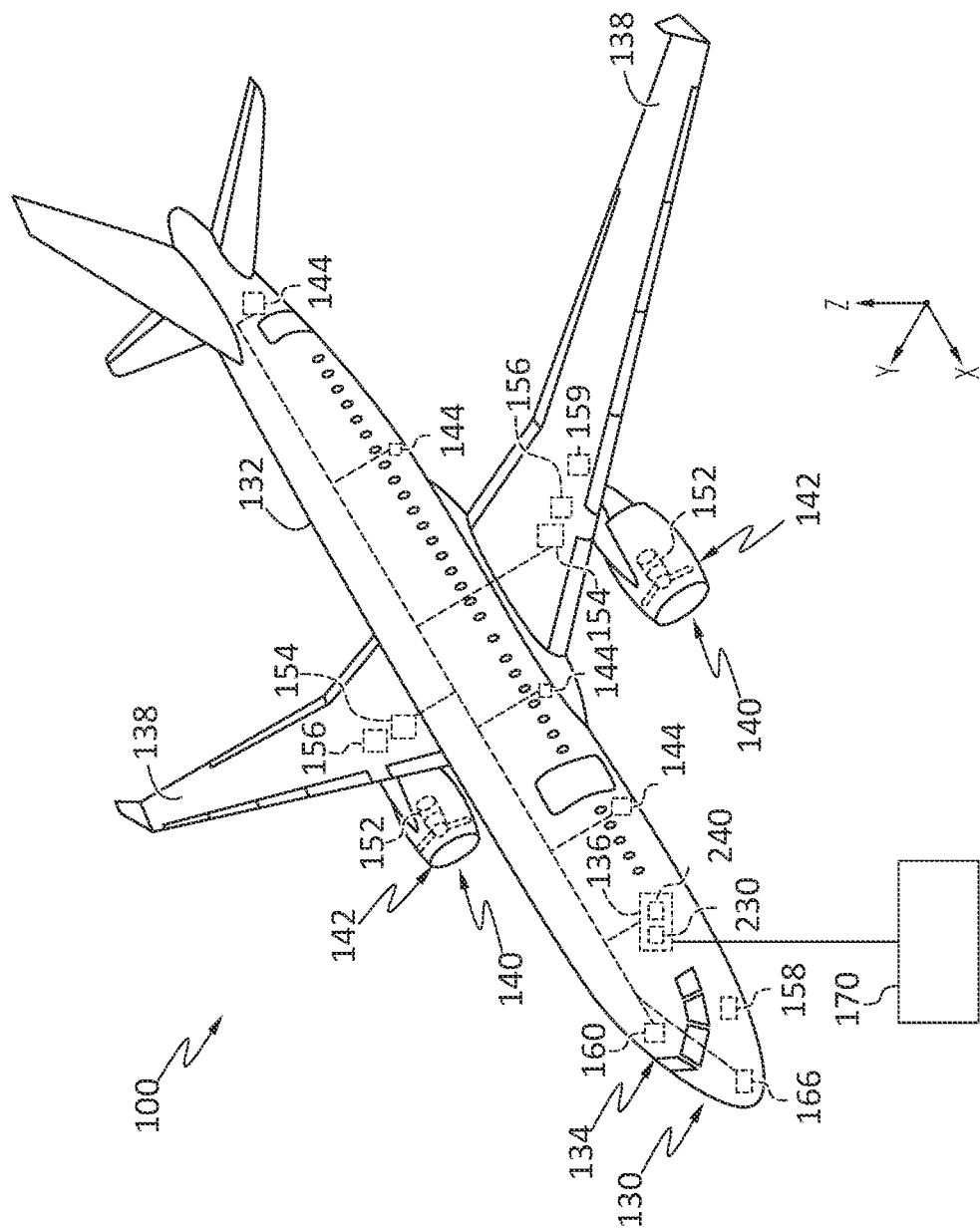
FIG. 1 schematically depicts an example aircraft system according to one or more embodiments shown and described herein.

Embodiments of the present disclosure relate to hybrid AC power distribution systems for starting and operating high frequency AC electric motors. For example, aircraft such as vertical take-off and landing (VTOL) aircraft utilize high frequency AC electric motors as a hybrid means of propulsion. For hybrid aircraft propulsion systems, system weight is critical. High power density high-speed motors and generators, especially permanent magnet (PM) motors and generators, are often implemented for such applications. To power the high frequency AC electric motors DC power distribution systems or AC power distribution systems may be used.

DC power distribution systems require a full-size power converter for each motor/generator, which increases the weight of the aircraft. On the other hand, AC power distribution systems may directly drive the high frequency AC electric motors from the generators, thereby providing a lower cost and lighter weight solution when the distance between the generators and motors is short. However, as previously noted, it is challenging to line start high frequency AC electric motors such as high speed PM motors of high-speed induction motors. The present disclosure includes system topologies and control methods to start the high-speed high frequency AC electric motors utilizing an AC power distribution system that delivers reduced cost and weight of the hybrid propulsion system.

Additionally, generators and motors typically operate at their highest capability with a lagging or leading power factor. That is, when AC power powers the AC electric motors directly from the generator(s), the highest capabilities for rated current cannot be achieved due to lack of reactive power. Consequently, the generator(s) and the AC electric motors will operate in the low efficiency operating region without reactive power. In present embodiments, the inverter is configured to inject reactive power into the AC power to the AC electric motors so that the AC electric motors operate at their full power and torque capability.

Additionally, when an AC electric motor is operated in an AC power distribution system, the AC electric motor can lose stability during a large transient. The capability of the AC electric motor to withstand large transient is a function of the flux level. The flux level of the AC electric motor can be changed by injecting reactive power using the inverter when powered directly from a generator. By controlling the flux level, the stability margin and the efficiencies of the generators and motors can be controlled.

Embodiments of the present disclosure enable the use of high speed, high power density, AC electrical motors and generators powered and operated with an AC power distribution system. For example, the AC power distribution system may deliver power from a generator powered by an engine or a secondary source such as a battery supply or ground power supply unit to the AC electrical motors configured as propulsion motors of the aircraft. A distribution bus (e.g., a first bus) provides AC power to the motors and a separate bus (e.g., a second bus) is configured to connect the starter generator, one or more inventers, and the AC electrical motors. Control methods and AC power distribution system topologies for starting the AC electrical motors using the separate bus will be described in more detail herein. Additionally, the topologies implement a fractionally sized configurable converter (e.g., an inverter-converter-inverter combination) used to start the AC electrical motors. After starting the AC electrical motors, the configurable converter may be utilized to improve the power capability efficiency and stability of the system as described in more detail herein.

Reference will now be made in detail to embodiments of AC power distribution systems, and components thereof, examples of which are illustrated in the accompanying drawings. Whenever possible, the same reference numerals will be used throughout the drawings to refer to the same or like parts. The detailed description uses numerical and letter designations to refer to features in the drawings. Like or similar designations in the drawings and description have been used to refer to like or similar parts of the invention. As used herein, the terms "first", "second", "third" and so on may be used interchangeably to distinguish one component from another and are not intended to signify location or importance of the individual components.

FIG. 1 depicts an illustrative aircraft system 100. In the illustrated embodiment of FIG. 1, the aircraft system 100 generally includes an aircraft 130, which may include a fuselage 132, wing assemblies 138, and one or more engines 140. While FIG. 1 depicts the aircraft 130 as being a fixed-wing craft having two wing assemblies 138 with one engine 140 mounted on each wing assembly 138 (e.g., two engines 140 total), other configurations are contemplated. However, other configurations and/or aerial vehicles may include high speed compound rotary-wing aircraft with supplemental translational thrust systems, dual contra-rotating, coaxial rotor system aircraft, turboprops, tilt-rotors, tilt-wing aircraft, conventional take-off and landing aircraft and VTOL aircraft such as quadcopters or other hybrid AC electric motor driven or turbine driven machines will also benefit from the present disclosure. For example, the various components described herein with respect to the aircraft 130 may be implemented in watercraft, spacecraft, land vehicles and/or the like without departing from the scope of the present disclosure. Furthermore, other configurations may include more than two wing assemblies 138, more than two engines 140 (e.g., trijets, quadjets, etc.), engines 140 that are not mounted to a wing assembly 138 (e.g., mounted to the fuselage 132, mounted to the tail, mounted to the nose, etc.), non-fixed wings (e.g., rotary wing aircraft), and/or the like. For example, an engine 140 may be a turbine engine, a piston engine, an AC electric motor or the like configured to provide propulsion to the aircraft 130. In some embodiments, an aircraft 130 may include one or more types of engines for propulsion. Such an aircraft may be referred to as a hybrid aircraft having a hybrid propulsion system.

Turning back to the illustrated aircraft system depicted in FIG. 1, as shown, a control mechanism 160 for controlling the aircraft 130 may be included in the cockpit 134 and may be operated by a pilot located therein. It should be understood that the term "control mechanism" as used herein is a general term used to encompass all aircraft control components.

A plurality of additional aircraft systems 144 that enable proper operation of the aircraft 130 may also be included in the aircraft 130 as well as a controller 136, and a communication system having the aircraft wireless communications link 166. The additional aircraft systems 144 may generally be any systems that effect control of one or more components of the aircraft 130, such as, for example, cabin pressure controls, elevator controls, rudder controls, flap controls, spoiler controls, landing gear controls, heat exchanger controls, and/or the like. In some embodiments, the avionics of the aircraft 130 may be encompassed by one or more of the additional aircraft systems 144. The aircraft wireless communications link 166 may generally be any air-to-ground communication system now known or later developed. Illustrative examples of the aircraft wireless communications link 166 include, but are not limited to, a transponder, a very high frequency (VHF) communication system, an aircraft communications addressing and reporting system (ACARS), a controller-pilot data link communications (CPDLC) system, a future air navigation system (FANS), and/or the like. The controller 136 may be communicatively coupled to the plurality of aircraft systems 144 and the engines 140. In some embodiments, the controller 136 may be mounted on one or more of the engines 140 or mounted within the aircraft 130 and communicatively coupled to the engines 140. While the embodiment depicted in FIG. 1 specifically refers to the controller 136, it should be understood that other controllers may also be included within the aircraft 130 to control various other aircraft systems 144 that do not specifically relate to the engines 140.

The controller 136 generally includes one or more components for controlling each of the engines 140, such as, for example, a diagnostic computer, an engine-related digital electronic unit that is mounted on one or more of the engines 140 or the aircraft 130, and/or the like. The controller 136 may also be a component of the aircraft or a remote system. Moreover, the controller 136 may control and operate the power distribution (e.g., an AC power distribution system) to the engines 140. Illustrative examples of an AC power distribution system will be depicted and described in more detail herein. Illustrative other components within the controller that may function with the controller 136 and may require software to operate include, but are not limited to, an electronic control unit (ECU) and other controller devices. The software implemented in any one of these components may be software that is distributed between components and controllers.

The controller 136 may also be connected with other controllers of the aircraft 130. In embodiments, the controller 136 may include a processor 230 and/or a non-transitory memory component 240, including non-transitory memory. In some embodiments, the non-transitory memory component 240 may include random access memory (RAM), read-only memory (ROM), flash memory, or one or more different types of portable electronic memory, such as discs, DVDs, CD-ROMs, or the like, or any suitable combination of these types of memory. The processor 230 may carry out one or more programming instructions stored on the non-transitory memory component 240, thereby causing operation of the controller 136. That is, the processor 230 and the non-transitory memory component 240 within the controller 136 may be operable to carry out the various processes described herein with respect to the controller 136, including operating various components of the aircraft 130 (such as the engine 140 and/or components thereof), monitoring the health of various components of the aircraft 130 (e.g., the engine 140 and/or components thereof), monitoring operation of the aircraft 130 and/or components thereof, installing software, installing software updates, modifying a record in a distributed ledger to indicate that software has been installed, and/or updated, carrying out processes according to installed and/or updated software, and/or the like. Moreover, the controller 136 may also monitor the electrical power generated and provided to a hybrid propulsion system including, for example, AC electric motors, configurable converters (e.g., an inverter-converter-inverter combination), switches, and/or the like. The controller 136 may further implement one or more sensors configured to monitor the frequency, the phase, amount of reactive power, amount or real power, and the like of the AC electrical power generated and provided to the AC electric motors. The controller 136 may be configured, as described in more detail herein to monitor and control the distribution of AC electrical power to the AC electric motors in order to start the motors and operate them at a high efficiency and stability.

In some embodiments, the controller 136 may be a full authority digital engine control (FADEC) system. Such a FADEC system can include various electronic components, one or more sensors, and/or one or more actuators that control each of the engines 140. In some embodiments, the FADEC system includes an electronic control unit (ECU), as well as one or more additional components that are configured to control various aspects of performance of the engines 140. The FADEC system generally has full authority over operating parameters of the engines 140 and cannot be manually overridden. A FADEC system generally functions by receiving a plurality of input variables of a current flight condition, including, but not limited to, air density, throttle lever position, engine temperature, engine pressure, and/or the like. The inputs are received, analyzed, and used to determine operating parameters such as, but not limited to, fuel flow, stator vane position, bleed valve position, and/or the like. The FADEC system may also control a start or a restart of the engines 140. The operating parameters of the FADEC can be modified by installing and/or updating software, such as the software that is distributed by the aircraft system 100 described herein. As such, the FADEC can be programmatically controlled to determine engine limitations, receive engine health reports, receive engine maintenance reports, and/or the like to undertake certain measures and/or actions in certain conditions.

In embodiments, each of the engines 140 may include a fan 142 and one or more sensors for sensing various characteristics of the fan 142 during operation of the engines 140. Illustrative examples of the one or more sensors include, but are not limited to, a fan speed sensor 152, a temperature sensor 154, a pressure sensor 156, a crosswind sensor 158, and/or other aircraft or flight sensors such as power sensors 159 that monitor characteristics of the electrical power delivered to the engine 140 or provided therefrom via an electromechanically coupled generator (e.g., a starter generator). The fan speed sensor 152 is generally a sensor that measures a rotational speed of the fan 142 within the engine 140. The temperature sensor 154 may be a sensor that measures a fluid temperature within the engine 140 (e.g., an engine air temperature), a temperature of fluid (e.g., air) at an engine intake location, a temperature of fluid (e.g., air) within a compressor, a temperature of fluid (e.g., air) within a turbine, a temperature of fluid (e.g., air) within a combustion chamber, a temperature of fluid (e.g., air) at an engine exhaust location, a temperature of cooling fluids and/or heating fluids used in heat exchangers in or around an engine, and/or the like. The pressure sensor 156 may be a sensor that measures a fluid pressure (e.g., air pressure) in various locations in and/or around the engine 140, such as, for example, a fluid pressure (e.g., air pressure) at an engine intake, a fluid pressure (e.g., air pressure) within a compressor, a fluid pressure (e.g., air pressure) within a turbine, a fluid pressure (e.g., air pressure) within a combustion chamber, a fluid pressure (e.g., air pressure) at an engine exhaust location, and/or the like. The crosswind sensor 158 may be one or more sensors that measure and/or contribute to the calculation of a cross wind as the plane traverses a flight path. The power sensors 159 may include voltage sensors, current sensors, power factor sensors, sensors configured to monitor the frequency of the AC power signal, reactive power sensors, and/or the like configured to monitor various characteristics of the electrical power.

As indicated by the dashed lines extending between the various sensors (e.g., the fan speed sensors 152, the temperature sensors 154, the pressure sensors 156, the crosswind sensors 158, the power sensors 159, and/or other sensors) and the aircraft systems 144 and the controller 136 in the embodiment depicted in FIG. 1, the various sensors may be communicatively coupled to the aircraft systems 144 and/or the controller 136 in some embodiments. As such, the various sensors may be communicatively coupled via wires or wirelessly to the aircraft systems 144 and/or the controller 136 to transmit signals and/or data to the aircraft systems 144 and/or the controller 136 via an aircraft bus.

An aircraft bus may enable an aircraft and/or one or more components of the aircraft to interface with one or more external system through wireless or wired means. An aircraft bus as used herein may be formed from any medium that is configured to transmit a signal. The signal may be a communication signal and/or a power signal. As non-limiting examples, the aircraft bus is formed of a plurality of conductive wires, conductive traces, optical waveguides, or the like. The aircraft bus may also refer to the expanse in which electromagnetic radiation and their corresponding electromagnetic waves are propagated. Moreover, the aircraft bus may be formed from a combination of mediums configured to transmit signals. In one embodiment, the aircraft bus includes a combination of conductive traces, conductive wires, connectors, and buses that cooperate to permit the transmission of electrical data signals to and from the various components of the controller 136. Additionally, it is noted that the term "signal" means a waveform (e.g., electrical, optical, magnetic, mechanical or electromagnetic) configured to travel through a medium, such as DC, AC, sinusoidal-wave, triangular-wave, square-wave, vibration, and the like.

For example, an interconnectivity of components coupled via a network, may include a wide area network, such as the internet, a local area network (LAN), a mobile communications network, a public service telephone network (PSTN) and/or other network and may be configured to electronically connect components. The illustrative components that may be connected via the network include, but are not limited to, a ground system in communication with the aircraft 130 (e.g., via a ground wireless communications link and an aircraft wireless communications link 166), and/or a ground support equipment 170 via a wired or wireless system.

It should be understood that the aircraft 130 merely represents one illustrative embodiment that may be configured to implement embodiments or portions of embodiments of the devices, systems, and methods described herein. During operation, by way of non-limiting example, the control mechanism 160 may be utilized to operate one or more of the aircraft systems 144. Various sensors, including, but not limited to, the fan speed sensors 152, the temperature sensors 154, the pressure sensors 156, the crosswind sensors 158, and/or the power sensors 159, may output data relevant to various characteristics of the engine 140 and/or the other aircraft systems 144. The controller 136 may utilize inputs from the control mechanism 160, the fan speed sensors 152, the temperature sensors 154, the pressure sensors 156, the crosswind sensors 158, the power sensors 159, the various aircraft systems 144, one or more database, and/or information from airline control, flight operations, or the like to diagnose, detect, and/or predict faults that airline maintenance crew may be unaware of.

While the embodiment of FIG. 1 specifically relates to components within an aircraft 130, the present disclosure is not limited to such. That is, the various components depicted with respect to the aircraft 130 may be incorporated within various other types of aircraft or vehicles and may function in a manners described herein. For example, the various components described herein with respect to the aircraft 130 may be implemented in watercraft, spacecraft, land vehicles and/or the like without departing from the scope of the present disclosure.

Furthermore, it should be appreciated that, although a particular aerial vehicle has been illustrated and described, other configurations and/or aerial vehicles, such as high speed compound rotary-wing aircraft with supplemental translational thrust systems, dual contra-rotating, coaxial rotor system aircraft, turboprops, tilt-rotors, tilt-wing aircraft, conventional take-off and landing aircraft and VTOL aircraft such as quadcopters or other hybrid AC electric motor driven or turbine driven machines will also benefit from the present disclosure.

In some embodiments, the aircraft 130 may be communicatively coupled to the various other components of the aircraft system 100 when on the ground and physically coupled to one of the components of the aircraft system 100, such as, for example, the ground support equipment 170.

The ground support equipment (GSE) 170 is an external equipment used to support and test the controller 136 and/or other components of the aircraft system 100. The GSE 170 is configured to control aircraft systems while the aircraft 130 is on the ground and optionally provide power to the aircraft for motor start-up and/or auxiliary operations while the aircraft 130 is on the ground. In embodiments, the GSE 170 may be connected to the controller 136 via wired local area network, or Ethernet and/or one or more electrical bus lines. The GSE 170 may communicate with the controller 136 according to Ethernet protocols. In some embodiments, the GSE 170 may be a portable maintenance access terminal. The GSE 170 may provide AC or DC electrical power to the aircraft, which is described in more detail herein.

Figure 2:
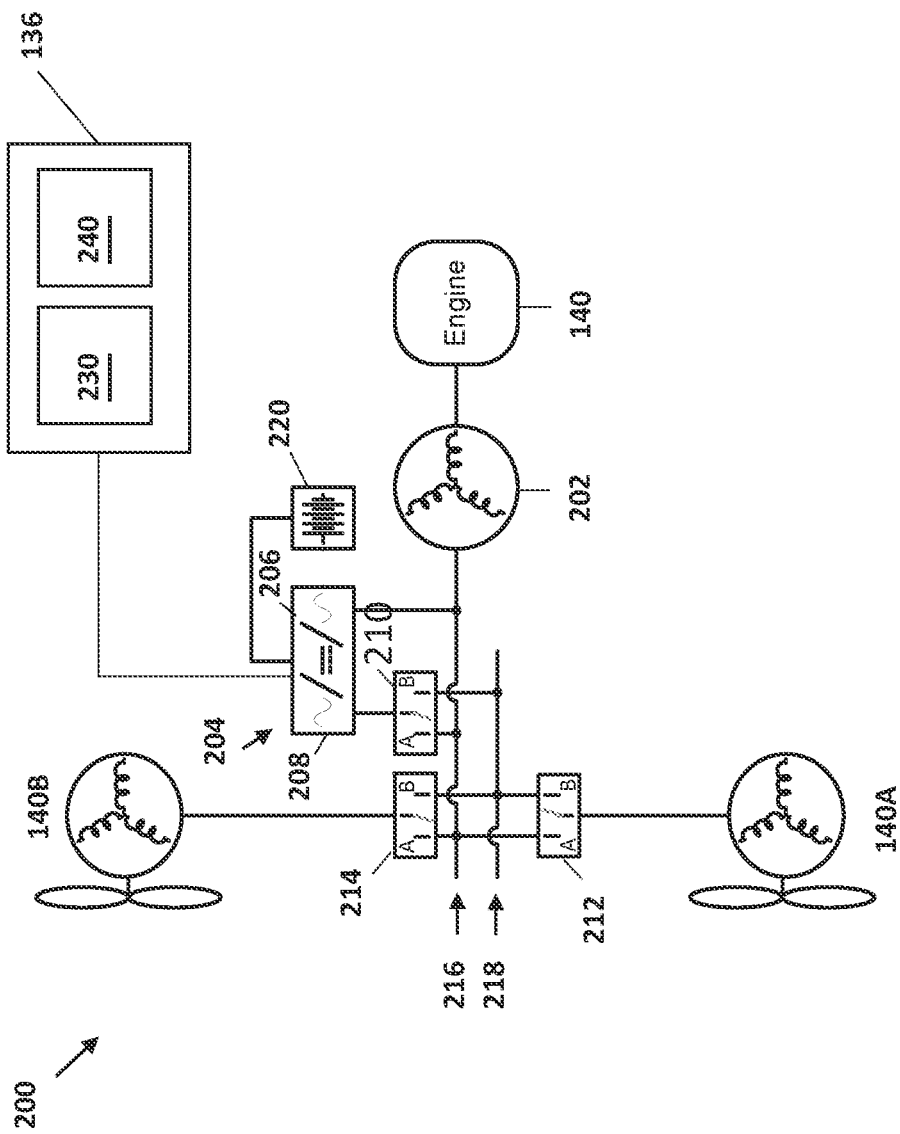
FIG. 2 depicts an illustrative schematic of an AC power distribution system according to one or more embodiments shown and described herein.

Referring now to FIG. 2, an AC power distribution system 200 according to the embodiments disclosed herein is depicted. In some embodiments, the AC power distribution system 200 includes a starter generator 202, a configurable converter 204 (e.g., an inverter-converter-inverter combination having a first inverter 206 and a second inverter 208), one or more switches 210, 212, 214, a first bus 216, a second bus 218, and/or an auxiliary power source 220. Topologies and operation of the AC power distribution system 200 will now be described in detail herein.

In some embodiments, an engine 140 such as an aircraft turbine engine is electromechanically coupled to the starter generator 202. The starter generator 202 is further electrically coupled to the first bus 216. The starter generator 202 is configured to operate as a generator when mechanical energy is received from the engine 140. The starter generator 202 generates AC electrical power at first frequency and a first voltage and supplies the AC electrical power to the first bus 216. The starter generator 202 may also be configured to operate as a starter motor when powered by AC power received from the first inverter 206 and the auxiliary power source 220. When the starter generator 202 is operating as a starter motor, the starter generator 202 may be used to start the engine 140, which may be a turbine engine. In some embodiments, more than one starter generator 202 may be implemented. For example, a first starter generator may be coupled to the high spool of the engine 140 and a second starter generator may be coupled to the low speed spool of the engine 140.

A first switch 210 selectively electrically couples the second inverter 208 to the first bus 216 when the first switch 210 is in a first position A. The first switch 210 selectively electrically couples the second inverter 208 to the second bus 218 when the first switch 210 is in a second position B. A second switch 212 selectively electrically couples the first electric motor 140A to the first bus 216, when the second switch 212 is in a first position A. The second switch 212 selectively electrically couples the first electric motor 140A to the second bus 218 when the second switch 212 is in a second position B. A third switch 214 selectively electrically couples the second electric motor 140B to the first bus 216 when the third switch 214 is in a first position A. The third switch 214 selectively electrically couples the second electric motor 140B to the second bus 218 when the third switch 214 is in a second position B. The first switch 210, the second switch 212, and the third switch 214 are each communicatively coupled to the controller 136. The controller 136 is configured to operate the position setting of the first switch 210, the second switch 212, and the third switch 214. Operation of the switches 210, 212, 214 will be described in more detail herein. Furthermore, although the AC power distribution system 200 depicts two electric motors 140A and 140B and three switches 210, 212, and 214, other embodiments, may include more or less switches and more or less electric motors. It should be understood that for each electric motor at least one corresponding switch to selectively connect the electric motor to the first bus 216 or the second bus 218. In some embodiments, an aircraft 130 may include 1, 2, 3, 4, 5, 6, 7, 8, or more electric motors and 1, 2, 3, 4, 5, 6, 7, 8, or more switches.

In some embodiments, an auxiliary power source 220 may be coupled to the combination converter 204. The auxiliary power source 220 may be a battery source or a ground support unit 170 configured to provide either AC or DC power to the AC power distribution system 200.

Referring now to FIGS. 3-8, operations of the AC power distribution system 200 including starting the engine 140 and the one or more AC electric motors 140A and 140B, controlling the operation of the one or more AC electric motors 140A and 140B during take-off and further controlling the operation of the one or more AC electric motors 140A and 140B during cruise mode will be described. In embodiments, operations of the AC power distribution system 200 are controlled by the controller 136.

Figure 3:
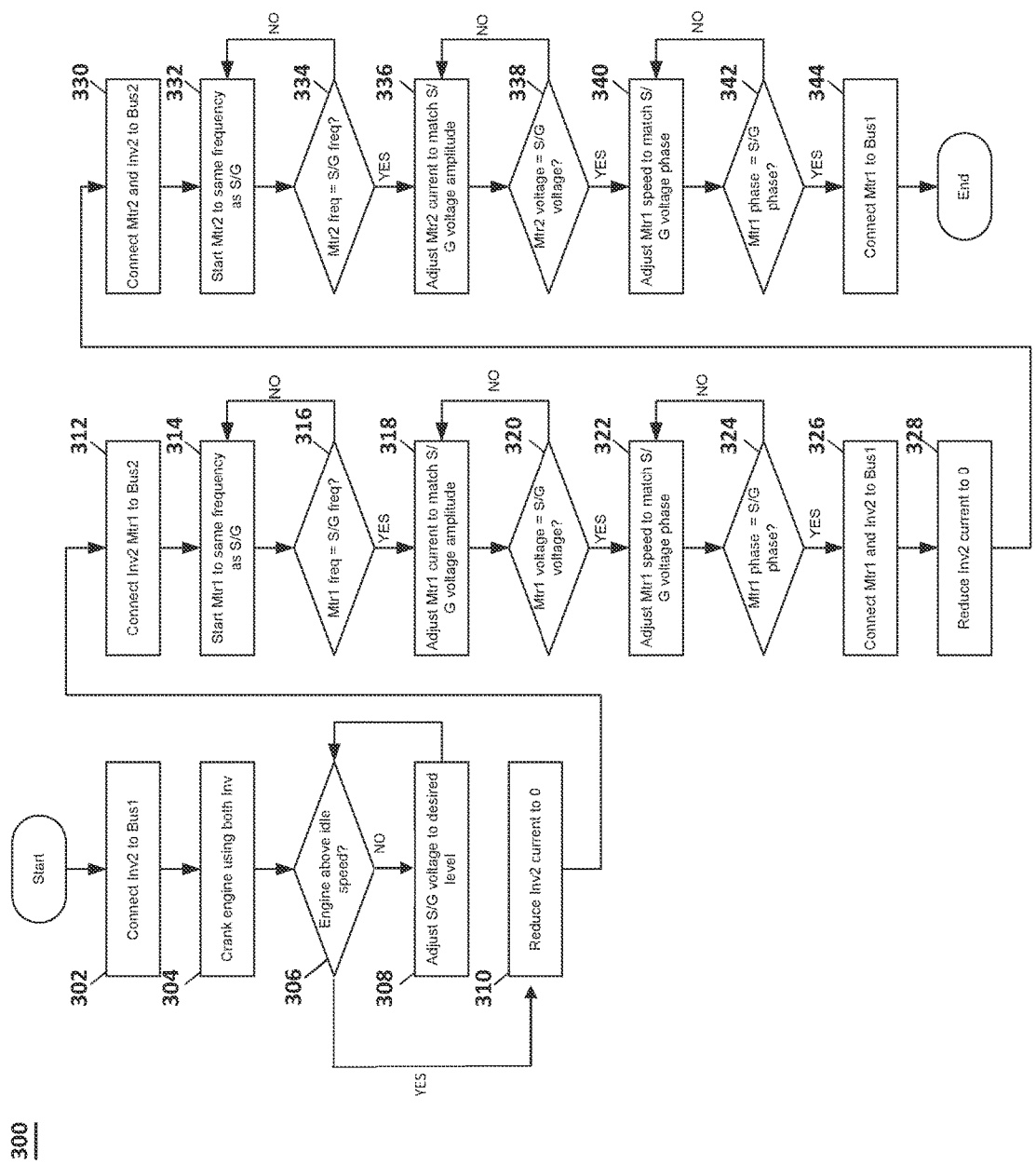
FIG. 3 depicts an illustrative flow diagram of an example method for controlling the operation of the AC power distribution system according to one or more embodiments shown and described herein.
Figure 4:
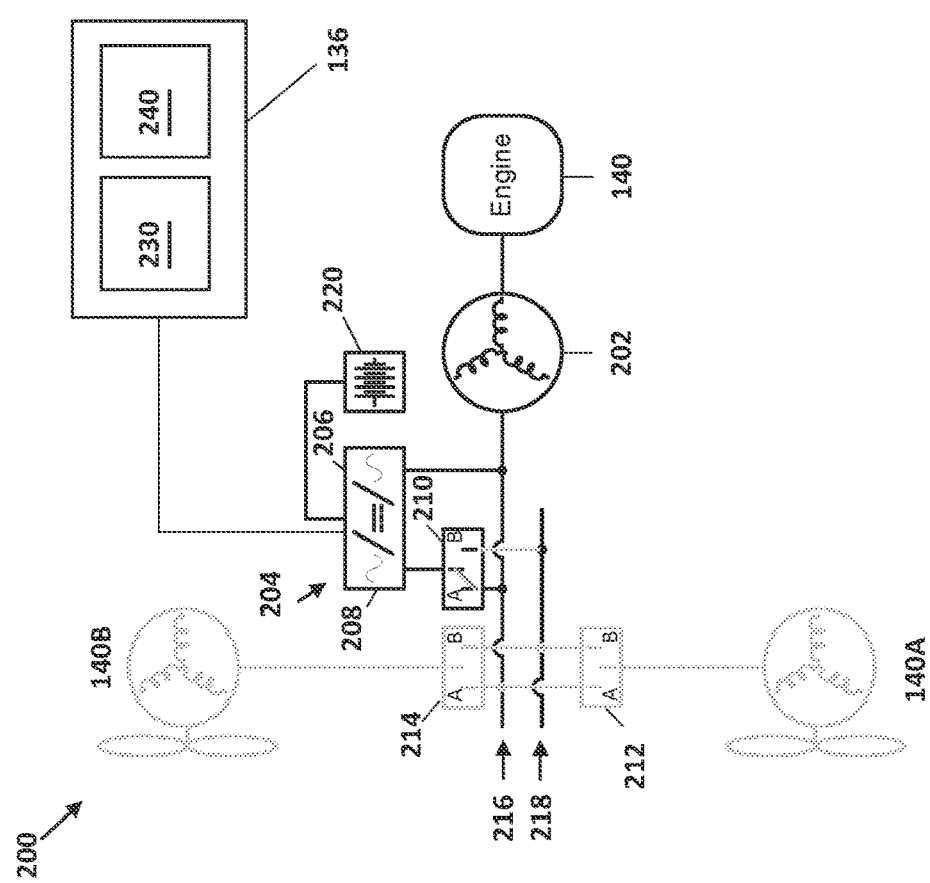
FIG. 4 depicts an illustrative schematic of an AC power distribution system configured to start an engine according to one or more embodiments shown and described herein.

Referring to FIG. 3, a flow diagram 300 depicting an illustrative method for controlling the operation of the AC power distribution system 200 with the controller is depicted. The method depicted in the flow diagram 300 will now be described with reference to the AC power distribution system 200 and the switch positions depicted in FIGS. 4-8. At block 302, the controller 136 connects the second inverter 208 to the first bus 216 by setting the first switch 210 to the second position B such that the first inverter 206 and the second inverter 208 are coupled in parallel. FIG. 4 depicts the AC power distribution system 200 and the switch position of the first switch 210 to start the engine 140. It should be understood that when starting the engine 140, the second switch 212 and the third switch 214 may be set to a disconnected state. In the disconnected state, the switches (e.g., the second switch 212 and the third switch 214) are not set to a first position A or a second position B, but rather to a third position, for example, a disconnected position where the switch contact is positioned between the first position A and the second position B. The controller 136 causes the auxiliary power source 220 to provide power to the configurable converter 204 (e.g., using both the first inverter 206 and the second inverter 208). The configurable converter 204 powers the starter generator 202, with an increasing amount of current, to run the starter generator 202 and start the engine 140. At block 306, the controller, via a signal from one or more sensors, determines whether the engine 140 has achieved or exceeds a predetermined idle speed. When the controller 136 determines that the engine 140 is not above the predetermined idle speed ("NO" at block 306), the controller 136 at block 308 adjusts the voltage, current, and/or frequency of the power provided to the starter generator 202 to increase the speed of the engine 140 during start-up. When the controller 136 determines that the engine 140 has achieved or exceeds the predetermined idle speed ("YES" at block 306), the controller 136 at block 310 reduces the voltage, current, and/or frequency of the power provided to the starter generator 202, optionally to zero power since the engine 140 is self-sustaining at or above an idle speed.

Figure 5:
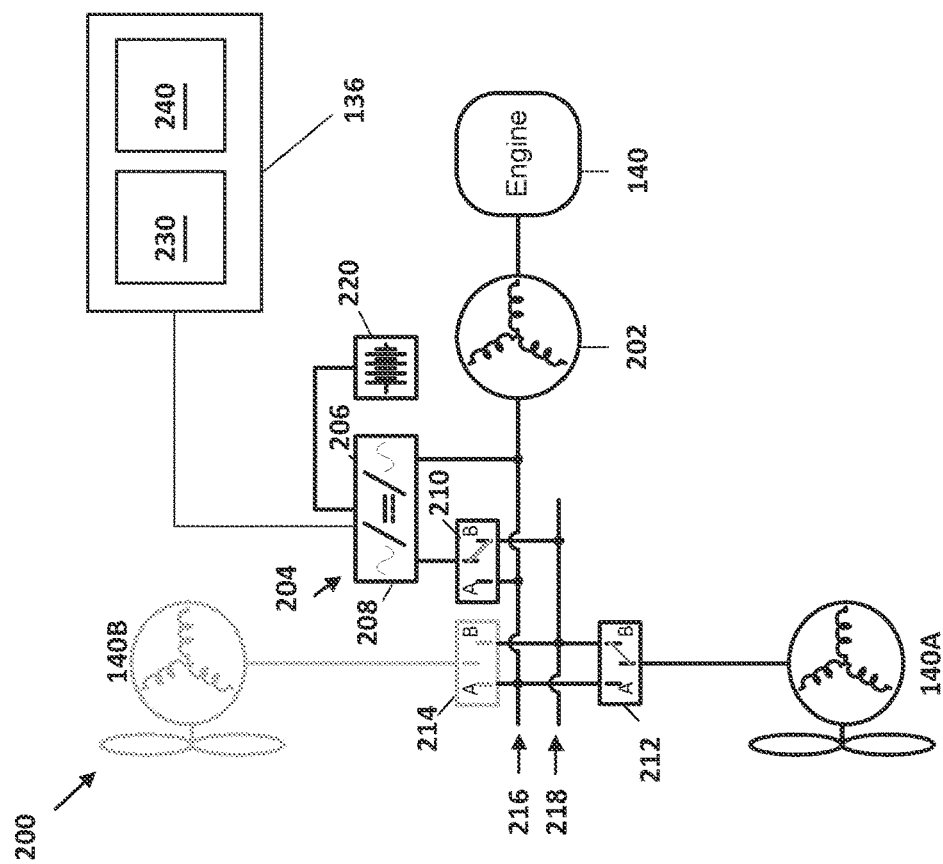
FIG. 5 depicts an illustrative schematic of an AC power distribution system configured to start a first electric motor according to one or more embodiments shown and described herein.

Once the engine 140 is started, the controller 136 at block 312 causes the first switch 210 to be set to the second position B such that the second inverter 208 of the configurable converter 204 is connected to the second bus 218 and the second switch 212 to be set to the second position B such that the first electric motor 140A is also electrically connects to the second bus 218. For example, FIG. 5 depicts the AC power distribution system 200 and the switch positions (e.g., the first switch 210 and the second switch 212) to start the first electric motor 140A. Once the first switch 210 is switched to the second position B, the AC power (e.g., at a first frequency and a first voltage) generated by the starter generator 202 from the mechanical energy provided by the engine 140 is provided to the first inverter 206 of the configurable converter 204. At block 314, the controller 136 causes the second inverter 208 to convert the AC power at the first frequency and the first voltage received from the first inverter 206 to a starting frequency and voltage power for starting the first electric motor 140A. The controller 136 at block 314 further causes the configurable converter 204 (e.g., using the first and second inverter 206, 208) to increase the starting frequency and voltage power to match the AC power at the first frequency and the first voltage provided to the first bus 216 by the starter generator 202.

At block 316, the controller 136 determines whether the frequency of the AC power supplied to the first electric motor 140A matches the frequency of the AC power supplied by the starter generator 202 to the first bus 216. In other words, the controller 136 uses the second invertor 208 to convert the frequency of the AC power supplied by the starter generator 202 to start the first electric motor 140A and increase the frequency until it matches the frequency of the AC power supplied to the first bus 216. At block 316, when the frequency of the AC power supplied to the first electric motor 140A via the second bus 218 is determined not to match the frequency of the AC power supplied by the starter generator 202 to the first bus 216 ("NO" at block 316), then the controller 136 continues to adjust the frequency of the AC power supplied by the second inverter 208 to the first electric motor 140A via the second bus 218 until it matches the frequency of the AC power supplied by the starter generator 202 to the first bus 216. At block 316, when the frequency of the AC power supplied to the first electric motor 140A via the second bus 218 is determined to match the frequency of the AC power supplied by the starter generator 202 to the first bus 216 ("YES" at block 316), then the controller 136 advances to block 318.

At block 318, the controller 136 adjusts the first electric motor 140A current to match the voltage amplitude of the AC power provided by the starter generator 202. The adjustments may occur in preprogramed steps that are implemented over a predefined period of time. At block 320, the controller 136 determines whether the first electric motor 140A voltage matches the voltage amplitude of the AC power supplied by the starter generator 202 to the first bus 216. In other words, the controller 136 uses the second invertor 208 to convert the voltage of the AC power supplied by the starter generator 202 to start the first electric motor 140A and increase the voltage until it matches the voltage of the AC power supplied to the first bus 216. At block 320, when the voltage of the AC power supplied to the first electric motor 140A via the second bus 218 is determined not to match the voltage of the AC power supplied by the starter generator 202 to the first bus 216 ("NO" at block 320), then the controller 136 continues to adjust the voltage of the AC power supplied by the second inverter 208 to the first electric motor 140A via the second bus 218 until it matches the voltage of the AC power supplied by the starter generator 202 to the first bus 216. At block 320, when the voltage of the AC power supplied to the first electric motor 140A via the second bus 218 is determined to match the voltage of the AC power supplied by the starter generator 202 to the first bus 216 ("YES" at block 320), then the controller 136 advances to block 322.

At block 322, the controller 136 adjusts the speed of the first electric motor 140A to match the voltage phase of the AC power provided by the starter generator 202. The adjustments may occur in preprogramed steps that are implemented over a predefined period of time. At block 324, the controller 136 determines whether the phase of the AC power provided to the first electric motor 140A via the second bus 218 matches the phase of the AC power supplied by the starter generator 202 to the first bus 216. In other words, the controller 136 uses the second invertor 208 to adjust the phase of the AC power supplied by the starter generator 202 to start the first electric motor 140A and continues to adjust the phase until it matches the phase of the AC power supplied to the first bus 216. At block 324, when the phase of the AC power supplied to the first electric motor 140A via the second bus 218 is determined not to match the phase of the AC power supplied by the starter generator 202 to the first bus 216 ("NO" at block 324), then the controller 136 continues to adjust the phase of the AC power supplied by the second inverter 208 to the first electric motor 140A via the second bus 218 until it matches the phase of the AC power supplied by the starter generator 202 to the first bus 216. At block 324, when the phase of the AC power supplied to the first electric motor 140A via the second bus 218 is determined to match the phase of the AC power supplied by the starter generator 202 to the first bus 216 ("YES" at block 324), then the controller 136 advances to block 326.

It should be understood that the controller 136 may execute blocks 314-324 in a predefined sequence or simultaneously to start up the first electric motor 140A. Once the AC power provided by the second inverter 208 has started the first electric motor 140A and the frequency, phase, and voltage of the AC power matches the frequency, phase, and voltage of the AC power generated by the starter generator 202 and supplied to the first bus 216, the controller 136 at block 326 sets the first switch 210 to the first position A and the second switch 212 to the first position A. At block 328, the controller 136 reduces the AC power supplied by the second inverter 208 to a zero power level. When the second switch 212 is set to the first position A, the first electric motor 140A is electrically connected to the first bus 216 and receives AC power from the starter generator 202.

In embodiments where there are additional electric motors to be started, the controller 136 may continue to execute electric motor start procedures, for example, blocks 330-344. For example, in an embodiment where the AC power distribution system 200 includes a second electric motor 140B, the controller 136 at block 330 causes the first switch 210 to be set to the second position B such that the second inverter 208 of the configurable converter 204 is connected to the second bus 218 and the third switch 214 to be set to the second position B such that the second electric motor 140B is also electrically connects to the second bus 218

Figure 6:
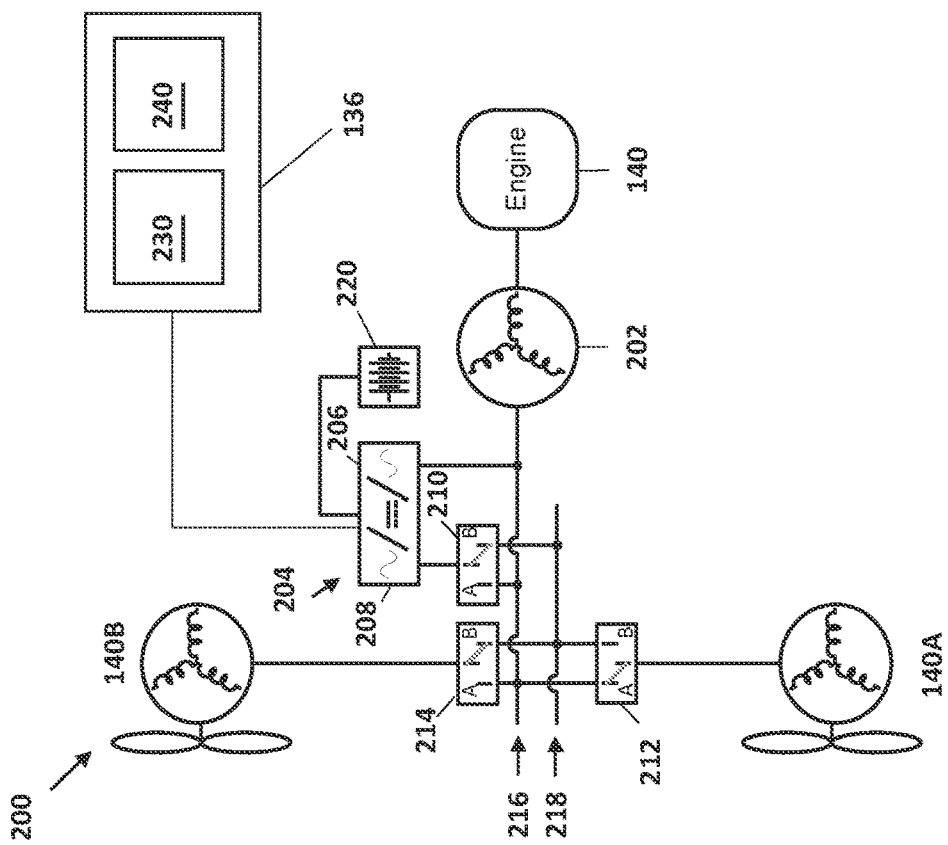
FIG. 6 depicts an illustrative schematic of an AC power distribution system configured to start a second electric motor according to one or more embodiments shown and described herein.

For example, FIG. 6 depicts the AC power distribution system 200 and the switch positions (e.g., the first switch 210 and the second switch 212) to start the second electric motor 140B. Once the first switch 210 is switched to the second position B, the AC power (e.g., at a first frequency and a first voltage) generated by the starter generator 202 from the mechanical energy provided by the engine 140 is provided to the first inverter 206 of the configurable converter 204. At block 332, the controller 136 causes the second inverter 208 to convert the AC power at the first frequency and the first voltage received from the first inverter 206 to a starting frequency and voltage power for starting the second electric motor 140B. The controller 136 at block 332 further causes the configurable converter 204 (e.g., using the first and second inverter 206, 208) to increase the starting frequency power to match the AC power at the first frequency and the first voltage provided to the first bus 216 by the starter generator 202.

At block 334, the controller 136 determines whether the frequency of the AC power supplied to the second electric motor 140B matches the frequency of the AC power supplied by the starter generator 202 to the first bus 216. In other words, the controller 136 uses the second invertor 208 to convert the frequency of the AC power supplied by the starter generator 202 to start the second electric motor 140B and increase the frequency until it matches the frequency of the AC power supplied to the first bus 216. At block 334, when the frequency of the AC power supplied to the second electric motor 140B via the second bus 218 is determined not to match the frequency of the AC power supplied by the starter generator 202 to the first bus 216 ("NO" at block 334), then the controller 136 continues to adjust the frequency of the AC power supplied by the second inverter 208 to the second electric motor 140B via the second bus 218 until it matches the frequency of the AC power supplied by the starter generator 202 to the first bus 216. At block 334, when the frequency of the AC power supplied to the second electric motor 140B via the second bus 218 is determined to match the frequency of the AC power supplied by the starter generator 202 to the first bus 216 ("YES" at block 334), then the controller 136 advances to block 336.

At block 336, the controller 136 adjusts the second electric motor 140B current to match the voltage amplitude of the AC power provided by the starter generator 202. The adjustments may occur in preprogramed steps that are implemented over a predefined period of time. At block 338, the controller 136 determines whether the second electric motor 140B voltage matches the voltage amplitude of the AC power supplied by the starter generator 202 to the first bus 216. In other words, the controller 136 uses the second invertor 208 to convert the voltage of the AC power supplied by the starter generator 202 to start the second electric motor 140B and increases the voltage until it matches the voltage of the AC power supplied to the first bus 216. At block 338, when the voltage of the AC power supplied to the first electric motor 140A via the second bus 218 is determined not to match the voltage of the AC power supplied by the starter generator 202 to the first bus 216 ("NO" at block 338), then the controller 136 continues to adjust the voltage of the AC power supplied by the second inverter 208 to the second electric motor 140B via the second bus 218 until it matches the voltage of the AC power supplied by the starter generator 202 to the first bus 216. At block 338, when the voltage of the AC power supplied to the second electric motor 140B via the second bus 218 is determined to match the voltage of the AC power supplied by the starter generator 202 to the first bus 216 ("YES" at block 338), then the controller 136 advances to block 340.

At block 340, the controller 136 adjusts the speed of the second electric motor 140B to match the voltage phase of the AC power provided by the starter generator 202. The adjustments may occur in preprogramed steps that are implemented over a predefined period of time. At block 342, the controller 136 determines whether the phase of the AC power provided to the second electric motor 140B via the second bus 218 matches the phase of the AC power supplied by the starter generator 202 to the first bus 216. In other words, the controller 136 uses the second invertor 208 to adjust the phase of the AC power supplied by the starter generator 202 to start the second electric motor 140B and continues to adjust the phase until it matches the phase of the AC power supplied to the first bus 216. At block 342, when the phase of the AC power supplied to the second electric motor 140B via the second bus 218 is determined not to match the phase of the AC power supplied by the starter generator 202 to the first bus 216 ("NO" at block 342), then the controller 136 continues to adjust the phase of the AC power supplied by the second inverter 208 to the second electric motor 140B via the second bus 218 until it matches the phase of the AC power supplied by the starter generator 202 to the first bus 216. At block 342, when the phase of the AC power supplied to the second electric motor 140B via the second bus 218 is determined to match the phase of the AC power supplied by the starter generator 202 to the first bus 216 ("YES" at block 342), then the controller 136 advances to block 344.

It should be understood that the controller 136 may execute blocks 330-344 in a predefined sequence or simultaneously to start up the second electric motor 140B. Once the AC power provided by the second inverter 208 has started the second electric motor 140B and the frequency, phase, and voltage of the AC power matches the frequency, phase, and voltage of the AC power generated by the starter generator 202 and supplied to the first bus 216, the controller 136 at block 344 sets the first switch 210 to the first position A and the third switch 214 to the first position A. When the third switch 214 is set to the first position A, the first electric motor 140A and the second electric motor 140B are electrically connected to the first bus 216 and receive AC power from the starter generator 202.

If there are additional electric motors to start, the controller can continue starting the electric motors in sequence as described herein, by isolating the electric motor using the second bus 218 and providing start-up power to the motor via the second inverter until the electric motor is started. Once the electric motor is started, the electric motor is switched from the second bus to the first bus where AC power is supplied by the starter generator 202.

Figure 7:
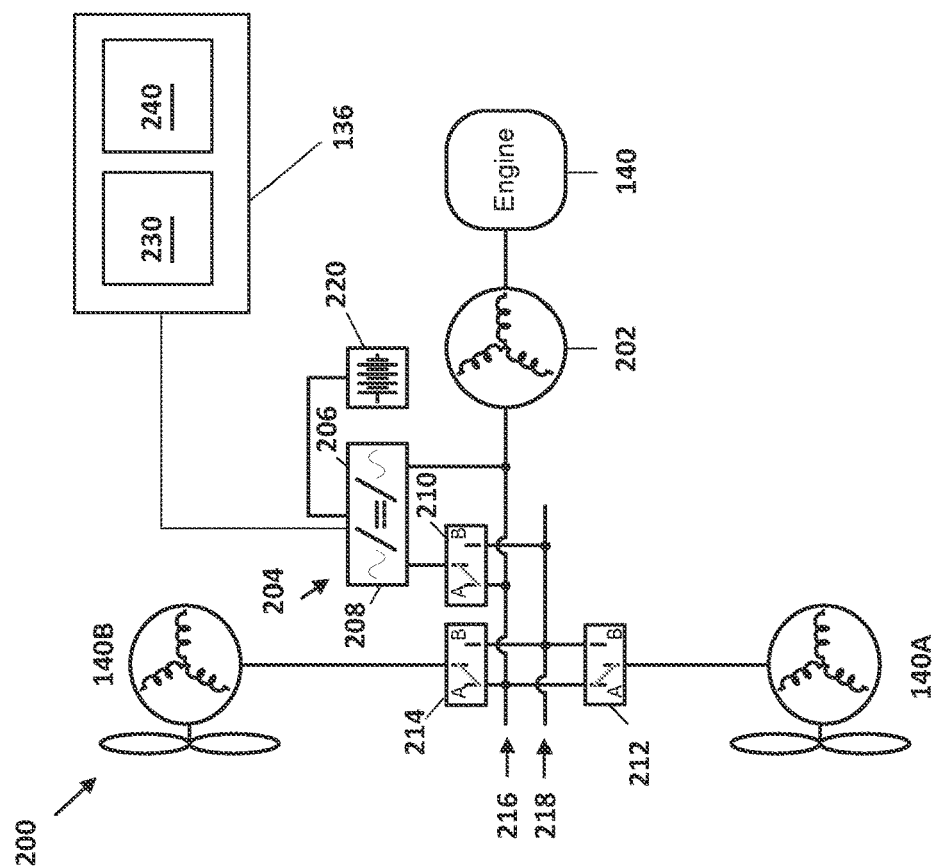
FIG. 7 depicts an illustrative schematic of an AC power distribution system configured to inject additional power for take-off according to one or more embodiments shown and described herein.

Turning to FIG. 7, once the electric motors are started and the aircraft is ready for take-off, the controller 136 may further control the operation of the configurable converter 204 to supply (e.g., inject) additional power, optionally from the auxiliary power source, to the first bus 216. The additional power may increase the flux level and/or the AC power to provide peak power to the electric motors (e.g., the first electric motor 140A and the second electric motor 140B) during take-off. In order for the configurable converter 204 to supply additional power to the first bus 216, the controller 136 causes the first switch 210 to be switched to the first position A such that the second inverter 208 is electrically coupled to the first bus 216 and the auxiliary power source 220 provides power to the second inverter 208. The second inverter 208 generates AC power to inject into the AC power provided by the starter generator 202 to the first bus 216.

Figure 8:
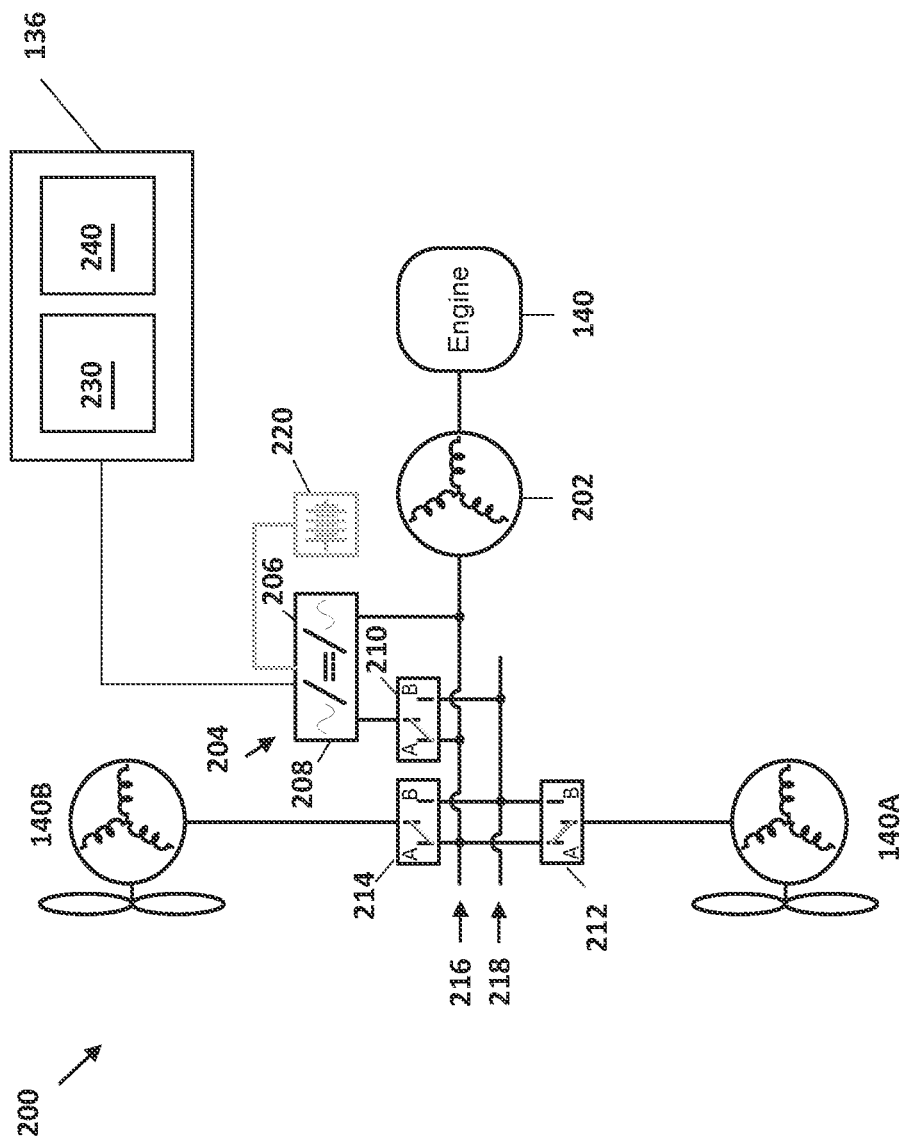
FIG. 8 depicts an illustrative schematic of an AC power distribution system configured to operate the electric motors in cruising mode according to one or more embodiments shown and described herein.

Furthermore, referring to FIG. 8, the AC power distribution system 200 and the switch positions (e.g., the first switch 210 and the second switch 212) for cruising operation of the aircraft is depicted. While the aircraft is cruising, the first electric motor 140A and the second electric motor 140B are connected to the first bus 216 and receive AC power from the starter generator 202 that is powered by the engine 140. As described above, electric motors typically operate at their highest capability with a lagging or leading power factor. That is, some machines require reactive power to achieve rated power and/or torque. To create a lagging or leading power factor, the AC power distribution system 200 may be configured to inject reactive power into the AC power supplied to the electric motors. In embodiments, the first inverter 206 and/or the second inverter 208 may be configured to generate an AC power signal having a lagging or leading power factor and provides the AC power to the first bus to optimize efficiency of the hybrid propulsion system while maintaining a flux level margin to avoid pullout. The first inverter 206 and/or the second inverter 208 may extract power from the starter generator 202 and/or the auxiliary power source 220. In some embodiments, the first inverter 206 and/or the second inverter 208 may receive AC power from the starter generator 202 and charge the auxiliary power source 220 that includes one or more batteries.

It should be understood that the present disclosure provides a distributed hybrid propulsion system with a plurality of electrically driven propellers powered by electric motors. Embodiments use AC electric distribution to deliver power from the generator to the propulsion motor. For example, in addition to the distribution bus (e.g., the first bus 216), a separate bus (e.g., the second bus) is used for starting the electric motors or starter generators. Embodiments described herein require only a fractionally sized configurable converter that is used to start the propulsion motors sequentially. After starting the electric motors, the configurable converter is used improve power capability, efficiency and stability of the system by injecting additional power and/or supplying reactive power to the electric motors. Moreover, it should be understood that embodiments use a configurable converter (e.g., an inverter-converter-inverter combination) and a set of switches to configure the system to start generators and motors in sequence. Such embodiments enable the use of high speed high power density electrical motors and generators with AC distribution systems that deliver reduced system costs and overall weight, which is critical, for example, for smaller aircrafts in general aviation and VTOL application.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

Further aspects of the invention are provided by the subject matter of the following clauses:

A first aspect A1 includes a method of operating a hybrid propulsion system, the method comprising: setting a first switch to a second position and a second switch to a second position, wherein a first motor is electrically coupled a second inverter and a starter generator via a second bus; causing the second inverter to convert an AC power received from a first inverter to a starting AC power for starting the first motor; causing the second inverter to increase the starting AC power to match the AC power provided to a first bus from the starter generator; and switching the second switch to a first position, when the starting AC power matches the AC power provided to the first bus from the starter generator.

A second aspect A2 includes the method of the first aspect A1, further comprising causing the second inverter to increase a frequency of the starting AC power to match a first frequency of the AC power provided to the first bus from the starter generator.

A third aspect A3 includes the method of any preceding aspect, further comprising causing the second inverter to increase a voltage of the starting AC power to match a first voltage of the AC power provided to the first bus from the starter generator.

A fourth aspect A4 includes the method of any preceding aspect, further comprising causing cause the second inverter to adjust a phase of the starting AC power to match a phased of the AC power provided to the first bus from the starter generator.

A fifth aspect A5 includes the method of any preceding aspect, further comprising: setting the first switch to the second position and a third switch to a second position, wherein a second motor is electrically coupled the second inverter and the starter generator via the second bus; causing the second inverter to convert the AC power received from the first inverter to the starting AC power for starting the second motor; causing the second inverter to increase the starting AC power to match the AC power provided to the first bus from the starter generator; and switching the third switch to the first position, when the starting AC power matches the AC power provided to the first bus from the starter generator.

A sixth aspect A6 includes the method of any preceding aspect, further comprising: setting the first switch to the first position and the second switch to a disconnected position, wherein the first inverter and the second inverter are electrically coupled to the starter generator via the first bus, causing the first inverted and the second inverter supply AC power from an auxiliary power source to the starter generator such that the starter generator starts an engine.

A seventh aspect A7 includes the method of any preceding aspect, further comprising: determining whether the engine is operating at or above a predetermined idle speed, and in response to determining that the engine is operating below the predetermined idle speed, causing the first inverter and the second inverter to increase the AC power provided to the starter generator and thereby increasing a speed of the engine.

An eighth aspect A8 includes the method of any preceding aspect, further comprising: setting the first switch to the first position, wherein the second inverter is electrically coupled to the first bus, and causing the second inverter to inject additional AC power from an auxiliary power source to the first bus to provide additional AC power to the first motor.

An ninth aspect A9 includes the method of any preceding aspect, further comprising: setting the first switch to the first position, wherein the second inverter is electrically coupled to the first bus, and cause the second inverter to inject AC power having a lagging or leading power factor from an auxiliary power source to the first bus such that reactive power is provided to the first motor.

A tenth aspect A10 includes a hybrid propulsion system includes a starter generator configured to provide AC power to a first bus and a first inverter; a second inverter electrically coupled to the first inverter; a first switch configured to selectively couple the second inverter to the first bus when in a first position and to a second bus when in a second position; a second switch configured to selectively couple a first motor to the first bus when in a first position and to the second bus when in a second position; and a controller electrically coupled to the second inverter, the first switch, and the second switch, wherein the controller is configured to: set the first switch to the second position and the second switch to the second position, wherein the first motor is electrically coupled the second inverter and the starter generator via the second bus, cause the second inverter to convert the AC power received from the first inverter to a starting AC power for starting the first motor, cause the second inverter to increase the starting AC power to match the AC power provided to the first bus from the starter generator, and switch the second switch to the first position, when the starting AC power matches the AC power provided to the first bus from the starter generator.

An eleventh aspect A11 includes the hybrid propulsion system the tenth aspect A10, wherein the controller is further configured to cause the second inverter to increase a frequency of the starting AC power to match a first frequency of the AC power provided to the first bus from the starter generator.

A twelfth aspect A12 includes the hybrid propulsion system of any preceding aspect, wherein the controller is further configured to cause the second inverter to increase a voltage of the starting AC power to match a first voltage of the AC power provided to the first bus from the starter generator.

A thirteenth aspect A13 includes the hybrid propulsion system of any preceding aspect, wherein the controller is further configured to cause the second inverter to adjust a phase of the starting AC power to match a phased of the AC power provided to the first bus from the starter generator.

A fourteenth aspect A14 includes the hybrid propulsion system of any preceding aspect, further comprising: a third switch configured to selectively couple a second motor to the first bus when in a first position and to the second bus when in a second position and the controller is further configured to: set the first switch to the second position and the third switch to the second position, wherein the second motor is electrically coupled the second inverter and the starter generator via the second bus, cause the second inverter to convert the AC power received from the first inverter to the starting AC power for starting the second motor, cause the second inverter to increase the starting AC power to match the AC power provided to the first bus from the starter generator, and switch the third switch to the first position, when the starting AC power matches the AC power provided to the first bus from the starter generator.

A fifteenth aspect A15 includes the hybrid propulsion system of any preceding aspect, further comprising an auxiliary power source electrically coupled to the first inverter and the second inverter, and an engine electromechanically coupled to the starter generator, wherein the controller is configured to: set the first switch to the first position and the second switch to a disconnected position, wherein the first inverter and the second inverter are electrically coupled to the starter generator via the first bus, cause the first inverted and the second inverter supply AC power from the auxiliary power source to the starter generator such that the starter generator starts the engine.

A sixteenth aspect A16 includes the hybrid propulsion system of any preceding aspect, wherein the controller is further configured to: determines whether the engine is operating at or above a predetermined idle speed, and in response to determining that the engine is operating below the predetermined idle speed, cause the first inverter and the second inverter to increase the AC power provided to the starter generator and thereby increasing a speed of the engine.

A seventeenth aspect A17 includes the hybrid propulsion system of any preceding aspect, further comprising an auxiliary power source electrically coupled to the second inverter, wherein the controller is further configured to: set the first switch to the first position, wherein the second inverter is electrically coupled to the first bus, and cause the second inverter to inject additional AC power from the auxiliary power source to the first bus to provide additional AC power to the first motor.

An eighteenth aspect A18 includes the hybrid propulsion system of any preceding aspect, further comprising an auxiliary power source electrically coupled to the second inverter, wherein the controller is further configured to: set the first switch to the first position, wherein the second inverter is electrically coupled to the first bus, and cause the second inverter to inject AC power having a lagging or leading power factor from the auxiliary power source to the first bus such that reactive power is provided to the first motor.

A nineteenth aspect A19 includes a vehicle, comprising: a hybrid propulsion system comprising: a starter generator configured to provide AC power to a first bus and a first inverter; a second inverter electrically coupled to the first inverter; a first switch configured to selectively couple the second inverter to the first bus when in a first position and to a second bus when in a second position; a second switch configured to selectively couple a first motor to the first bus when in a first position and to the second bus when in a second position; and a controller electrically coupled to the second inverter, the first switch, and the second switch, wherein the controller is configured to: set the first switch to the second position and the second switch to the second position, wherein the first motor is electrically coupled the second inverter and the starter generator via the second bus, cause the second inverter to convert the AC power received from the first inverter to a starting AC power for starting the first motor, cause the second inverter to increase the starting AC power to match the AC power provided to the first bus from the starter generator, and switch the second switch to the first position, when the starting AC power matches the AC power provided to the first bus from the starter generator.

A twentieth aspect A20 includes the vehicle of the nineteenth aspect A19, further comprising a propeller coupled to the first motor

What is claimed is:

1. A method of operating a hybrid propulsion system, the method comprising:
    controllably providing a first alternating current (AC) power to a first bus and a first inverter;
    electrically coupling a first motor with a second inverter by way of a second bus;
    operably converting, by the second inverter, the first AC power received by the first inverter to a starting AC power adapted for starting the first motor;
    increasing, by the second inverter, a frequency of the starting AC power to match a frequency of the first AC power received; and
    electrically coupling the first motor with a first bus when the starting AC power matches the first AC power received.

2. The method of claim 1, wherein electrical coupling further comprises electrically coupling, by way of at least a first switch and a second switch, the first motor with the second inverter.

3. The method of claim 1, wherein increasing the starting AC power comprises adjusting, by the second inverter, a phase of the AC starting power to match a phase of the first AC power.

4. The method of claim 1, wherein increasing the starting AC power comprises increasing, by the second inverter, a voltage of the starting AC power to match a voltage of the first AC power.

5. The method of claim 1, further comprising generating, by a generator, the first AC power.

6. The method of claim 1, wherein increasing the starting AC power comprises adjusting, by the second inverter, a phase of the starting AC power to match a phase of the first AC power.

7. The method of claim 1, further comprising, after electrically coupling the first motor with a first bus, electrically coupling a second motor with the second inverter by way of the second bus.

8. The method of claim 1, further comprising, after electrically coupling the first motor with the first bus, electrically coupling an auxiliary power source to the first bus such that the auxiliary power source can operably inject additional power to the first motor by way of the first bus.

9. The method of claim 7, wherein electrically coupling an auxiliary power source to the first bus includes electrically coupling the auxiliary power source to the first bus by way of the second inverter, and further comprising operably converting, by the second inverter, the additional power to additional power having a lagging power factor or a leading power factor.

10. A hybrid propulsion system, comprising:
    a first inverter;
    a second inverter electrically coupled with the first inverter and selectively couplable with either a first bus or a second bus;
    a first motor selectively couplable with either the first bus or the second bus; and
    a controller configured to:

electrically couple the first motor with the second inverter by way of the second bus;

operably convert, by controlling the second inverter, a first power received from the first inverter to a starting alternating current (AC) power adapted for starting the first motor;

increase, by controlling the second inverter, a frequency of the starting AC power to match a frequency of the first bus; and electrically coupling the first motor with a first bus when the starting AC power matches the frequency of the first bus.

11. The hybrid propulsion system of claim 10, further comprising a generator configured to provide the first power to the first bus.

12. The hybrid propulsion system of claim 10, wherein the controller is further configured to increase a voltage of the starting AC power to match a voltage of the first bus.

13. The hybrid propulsion system of claim 10, wherein the controller is further configured to adjust a phase of the starting AC power to match a phase of the first bus.

14. The hybrid propulsion system of claim 10, further comprising, after electrically coupling the first motor with the first bus, electrically coupling an auxiliary power source to the first bus, and wherein the controller is configured to operably inject additional power to the first motor by way of operating providing power from the auxiliary power source to the first bus.

15. The hybrid propulsion system of claim 13, wherein the controller is further configured to operably convert, by controlling the second inverter, the additional power to starting AC power having a lagging power factor or a leading power factor.

16. A vehicle comprising the hybrid propulsion system of claim 10.

* * * * *